United States Patent [19]

Stratmann

[11] Patent Number: 5,717,865
[45] Date of Patent: Feb. 10, 1998

[54] METHOD FOR ASSISTING INDIVIDUALS IN DECISION MAKING PROCESSES

[76] Inventor: William C. Stratmann, 5504 SW. 84th Dr., Gainesville, Fla. 32608

[21] Appl. No.: 533,325

[22] Filed: Sep. 25, 1995

[51] Int. Cl.⁶ .................................................. G06F 19/00
[52] U.S. Cl. ............................................ 395/210; 395/201
[58] Field of Search .......................... 395/201, 210; 434/322, 327, 335, 353, 362

[56] References Cited

U.S. PATENT DOCUMENTS

| | | | |
|---|---|---|---|
| 4,358,277 | 11/1982 | Moyes et al. | 434/322 |
| 4,603,232 | 7/1986 | Kurland et al. | 179/2 |
| 4,642,780 | 2/1987 | Thomson | 364/512 |
| 4,863,384 | 9/1989 | Slade | 434/107 |
| 5,084,819 | 1/1992 | Dewey et al. | 364/419 |
| 5,551,880 | 9/1996 | Bonnstetter et al. | 434/236 |
| 5,563,994 | 10/1996 | Harmon et al. | 395/140 |
| 5,574,828 | 11/1996 | Hayward et al. | 395/50 |

OTHER PUBLICATIONS

William C. Stratmann, A Study of Consumer Attitudes About Health Care: The Delivery of Ambulatory Services, *Medical Care*, vol. 13, No. 6, Jun. 1975, pp. 537–548.

Stratmann, et al., Evaluating Hospital–Based Ambulatory Care, Chapters 2 and 6, 1980, pp. 11–36; 99–120.

*Primary Examiner*—Gail O. Hayes
*Assistant Examiner*—Barton L. Bainbridge
*Attorney, Agent, or Firm*—David H. Judson

[57] ABSTRACT

The present invention relates to a method for assisting an individual in making a selection amongst a plurality of choice items. The individual selects decision components having a relevance to the selection of a choice item and assigns values to each of the decision components. The user further assigns expected satisfaction scores to each decision component of each choice item indicating the expected satisfaction to be received from the decision components. The reliability of the expected satisfaction scores are indicated by assigned reliability factors. The assigned component values, expected satisfaction values, and reliability factors are then utilized to rank each of the choice items.

14 Claims, 5 Drawing Sheets

FIG. 3

Enter Choices

ChoiceList

Add

Delete

Close

FIG. 4

Add Criteria

Set Criteria
○ Include
○ Omit

| Criteria Description | Include |
|---|---|

Add

Delete

Close

FIG. 5

Criteria List
| | Criteria Description | Importance |

Importance
- Essential
- Important
- Relevant

[Close]

FIG. 6

Criteria List
| | Criteria Description | Importance |

Set Importance

Essential
- 10
- 9
- 8

Important
- 7
- 6
- 5
- 4

Relevant
- 3
- 2
- 1

FIG. 7

Select Anticipated Satisfaction from all Criteria for Each Choice Alternative

Anticipated Satisfaction Scale

100

0

Click anywhere on the scale to register your Anticipated Satisfaction level.

FIG. 8

Select Perceived Reliabilty of Satisfaction Estimates for all Criteria and Choices Reliability Scale

100

0

Click anywhere on the scale to register your Reliability Estimate.

METHOD FOR ASSISTING INDIVIDUALS IN DECISION MAKING PROCESSES

TECHNICAL FIELD

The present invention relates generally to customer decision making, and more particularly, to a computerized method for assisting a user in making and evaluating a decision.

BACKGROUND OF THE INVENTION

Man is differentiated from other animals by the ability to think, to reason, and to make evaluative decisions. Although we are not taught how to make decisions, the decisions we make are usually logical, given the information available. Many consumer decisions involve only a few variables and, therefore, pose little challenge to the decision maker. Other decisions, however, may involve long lists of alternative choices and many evaluative criteria, about which the decision maker is likely to be somewhat uninformed. Presently there are no computerized systems available to help people to make these kinds of complex decisions.

Systems for facilitating complex individual decision making, when used in conjunction with consumer surveys may also become an invaluable market research tool. Market research is the business of determining consumer likes, dislikes, wants, and needs—in short, consumer tastes. It is relatively easy to design survey questionnaires to document the preferences of individual consumers. Most market research, however, involves obtaining information from large samples of consumers. Traditional market research methods are of limited value in aggregating such information because of a technical problem called interpersonal comparison of utility.

The term utility was devised by economists to measure the degree to which people obtain satisfaction from one thing or another. Some people generate more satisfaction from large automobiles than from small automobiles. Some people receive more pleasure from warm colors than from bright colors. Most people have more preferred and less preferred articles in their wardrobes, and almost everyone prefers one political candidate or another at election time. In the vernacular of the economist, some people have greater utility for large cars than for small cars; some have greater utility for a pale blue than for red, some have greater utility for a pair of jeans than for a business suit, and some have greater utility for the Democratic Party than for the Republican Party.

Presently existing systems provide no reliable, objective way to compare the utilities of different individuals because there has been no agreed upon scale by which these individual preferences or utilities could be measured. Thus, the utility of one person's preference for, say, a large car, could not accurately be compared to another person's, because people measure their preferences with uniquely different personal scales.

The importance of scales in survey research cannot be overstated. Objective analysis of research findings is greatly dependent upon scalar data. Researchers use many different kinds of scales, the most useful of which are ratio scales, such as those used to measure time, distance, or weight. Unlike other kinds of scales, units of time, distance, or weight can be multiplied and divided, as well as added and subtracted. For example, two hours is twice as long as one hour, six inches is half the distance of twelve inches, and ten pounds is five times the weight of two pounds. Scales used to measure public opinion do not usually permit such arithmetic manipulation, and are therefore limited for purposes of aggregate analysis. For example, without qualifying the circumstance in some way, we cannot say that one person's preference for something is twice as great as another's, because there is no valid way by which we can compare the utility of one person's preferences with another's.

If, however, we qualify the comparison by focusing on the circumstance in which a person is faced with a choice from among similar alternatives, e.g., buying an automobile, we create a situation in which we can make objective comparisons about the evaluative criteria that people use to make such a decision. We call these evaluative criteria decision components. They can be depicted as wedges of a pie, proportional in size to their relative importance to the overall decision. By definition, therefore, they must sum to one hundred percent. By qualifying the circumstance in this way we create a decision making model in which the decision components can be measured with a ratio scale. We can therefore validly quantify and arithmetically manipulate the numerical values ascribed to the relative importance of, say, gas economy, quality of finish, or size to a group of consumers with respect to the purchase of an automobile. For example, such survey data may be used to show that among 50–60 year olds, the utility for, say, a large car is, unequivocally half that of 20–30 year olds, or that size of car explains, say, 24% of the overall choice.

Thus, a system that circumvents the issue of interpersonal comparison of utility and permits market researchers and others to generate much more precise information about consumer tastes than has heretofore been possible would greatly enhance the accuracy of market research.

BRIEF SUMMARY OF THE INVENTION

The present invention overcomes the foregoing and other problems with a computerized method for assisting and analyzing consumer decision marking. The method of the present invention mimics the consumer choice process by asking the user, first, to identify a plurality of alternatives from among which a choice is to be made, e.g., the purchase of a car. Using a computer, the user enters all relevant alternative choice items, e.g., Ford, Chevrolet, Buick, etc. Second, the user identifies all decision components (relevant evaluative criteria), e.g., size, horsepower, safety, gas economy, etc. These can be selected from a preexisting list in the computer. Any other decision components that are of any importance to the user can be entered manually. Third, the user assigns each decision component a numerical score indicating its importance to the user's decision. Fourth, the user assigns numerical scores indicating the expected satisfaction from each choice item for each decision component. If appropriate, the user also assigns a score to indicate the probable reliability of the information on which each expected satisfaction score is based. Multiplication of the expected satisfaction score by the probable reliability score yields a product called probable expected satisfaction. A computer program manipulates the numerical scores assigned to the importance of decision component and probable expected satisfaction and calculates the numerical values for each choice item. The choice item with the largest value is the user's most preferred choice, given his subjective preferences and the information available at the time.

The foregoing discussion is intended to outline only some of the more pertinent aspects of the present invention. These aspects should be construed as merely illustrative of some of the more prominent features and applications of the invention. Many other benefits can be attained by using the present invention in survey research as noted above, or by applying it in different contexts and/or by modifying the basic invention. A fuller appreciation for the invention and some of its possible modifications is found in the following detailed description of the preferred embodiment.

BRIEF DESCRIPTION OF THE DRAWINGS

For a more complete understanding of the present invention and the advantages thereof, reference should be made to the following drawings in which:

FIGS. 3–9 illustrate various computer screen displays for prompting a user to enter data to assist in consumer decision making and analysis.

DETAILED DESCRIPTION

Figure 1:
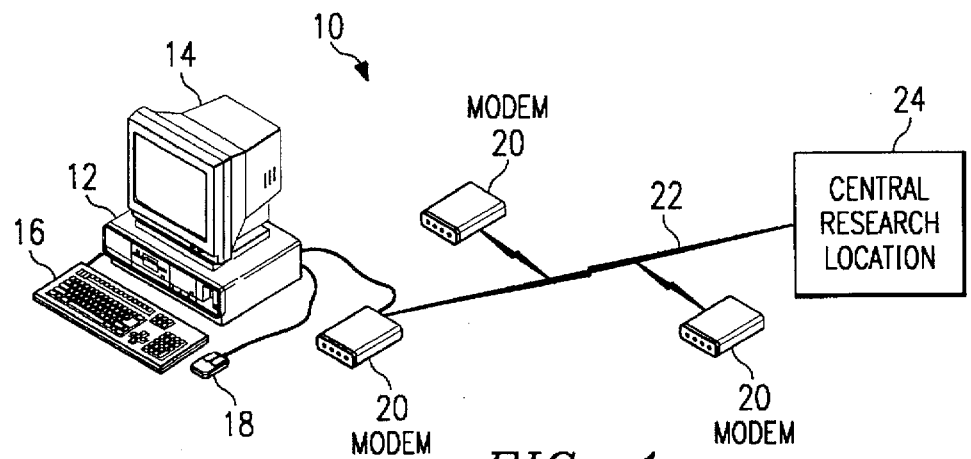
FIG. 1 is a block diagram illustrating the operating environment for the present invention.

FIG. 1 illustrates the environment of operation for the present invention. The computer 10 for use in supporting the applicant's method includes a central processing unit 12, display 14, keyboard 16, mouse 18, and one or more modems 20. Modems 20 may interconnect through a network 22 with a central research location 24. The central research location 24 includes remote data bases of choice items and decision components, and a means of storing market research data for the purpose of later aggregate analysis. Other modems 20 may be interconnected through the network 22 to provide survey data from a plurality of sources (not shown).

Figure 2:
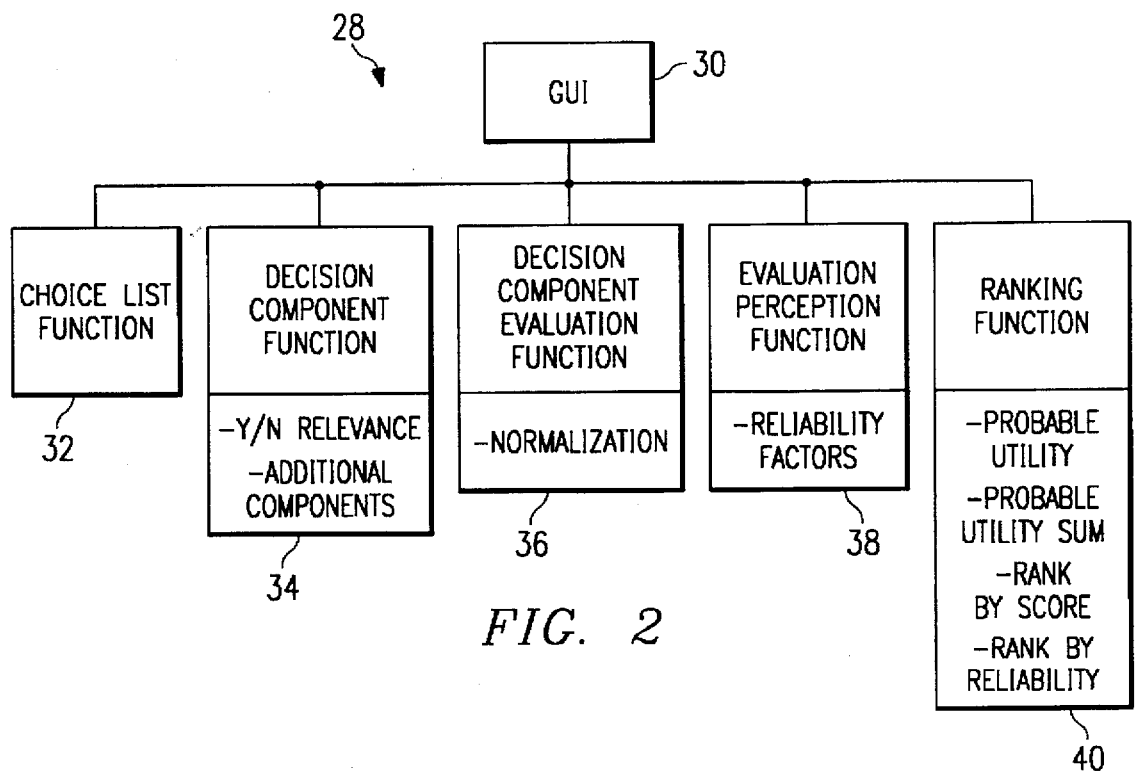
FIG. 2 is a block diagram illustrating the functionalities of the operating software of the present invention.

FIG. 2 illustrates a block diagram of the functional components 28 of the present invention. A user accesses the functional components 28 with a graphical user interface 30, which presents all of the graphical selection features involved on a display 14. The functional components 28 guide a user through the decision making process by presenting a number of computer screens on display 14. Through the graphical user interface 30, the user is able to access a choice list function 32, which enables the user to enter a list of choice items on a computer screen as shown in FIG. 3 (e.g., the names of alternative cards, laundry detergents, colleges, political candidates, etc.). The choice list may be pre-generated or manually entered. The pre-generated lists allow user selection of the choice items by add/delete responses. The manually entered list is generated on display 14 by entries made on Keyboard 16. The choice list function 32 accepts entry of a desired number of choice items or accesses pre-generated lists of choice items locally or remotely through modems 20.

The decision component function 34 enables a user to identify all decision components that might affect his choice of a particular item, e.g., for a laundry soap, such things as, cost, packaging, liquid or powder, bleaching action, and so forth. FIG. 4 shows this display. Decision components can be stored locally within the CPU 12 or they can be accessed externally via modems 20. The user can select decision components from those listed by simple yes/no entries or other similar type methods. After the user has selected any or all of the listed decision components, he has the option of entering manually any other evaluative criteria that are relevant to the selection of a choice item through the keyboard 16.

The decision component evaluation function 36 enables the user to assign a score indicating the importance of each decision component. The decision component evaluation function 36 enables a user to assign a value to each selected choice component on a scale of 1 to 10. While the present invention is described using a rating scale of 1 to 10 it should be appreciated that any scale capable of quantifying the value of a particular choice component could be used. The component evaluation function 36 presents the user with each of the choice components previously selected by the decision functions component 34 and prompts the user to assign a value to the choice component. In one embodiment, the user initially evaluates the importance of decision components as essential, important, or relevant (see FIG. 5). For each essential decision component the user then is asked to assign a numerical score of 8, 9 or 10; for each important decision component, a score of 4, 5, 6, or 7; and for each relevant decision component, a score of 1, 2, or 3 (see FIG. 6). The decision component evaluation function 36 then normalizes the numerical scores assigned to each decision component so that they sum to 100%. This arithmetic process creates a ratio scale by which it is possible to compare the importance of individual decision components and, for market research purposes, to aggregate and analyze the relative importance of these evaluative criteria among large numbers of users.

The evaluation perception function 38 generates a display screen enabling a user to indicate the satisfaction he might anticipate receiving from different choice items for particular decision components (see FIG. 7). In one embodiment, the screen uses a grid in which column headings represent different choice items and row headings represent decision components. Each decision component is presented in turn to the user, permitting the user to assign a score from an anticipated satisfaction scale to each decision component for each choice item.

Since the information on which expected satisfaction is based may be less than perfect, provision is made for the user to indicate the reliability of information used for these judgments by a reliability score (see FIG. 8, which uses a grid similar to FIG. 7). If the user is quite sure of the information on which expected satisfaction is based for a given decision component and choice item, he may assign a very high reliability score, say, 100%. If the information supporting a given estimate of satisfaction is uncertain, the user may assign a reliability score of, say, 50%. For purposes of calculating preferred choice, expected satisfaction is multiplied by the reliability score to produce the probable expected satisfaction score.

Figure 9:
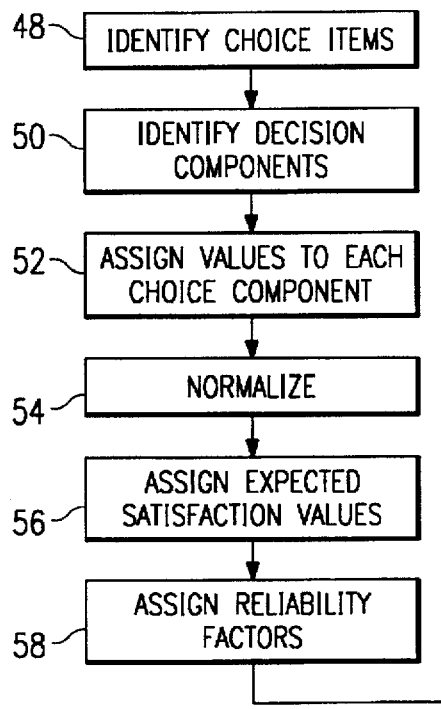

The ranking function 40 arithmetically manipulates data from the other functionalities. Each decision component's assigned user relevant score is multiplied by its probable expected satisfaction score to determine the expected value for a choice component. Each user relevant score is also multiplied by unity, to illustrate the impact that 100% reliability would have on the probable expected satisfaction score (see FIG. 9). These products are then summed for each choice item to generate a choice item score. The ranking function 40 rank then orders the choice items by the choice item scores. The choice item with the greatest score is the user's most preferred choice. Decision components can also be rank ordered by reliability to show the effect of incomplete or missing information on the user's choice.

Figure 10:
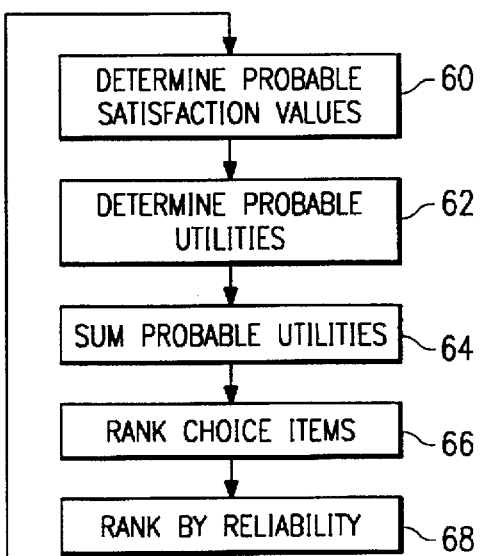
FIG. 10 is a flow diagram illustrating the method for assisting the user to make decisions from among a plurality of choice items.

FIG. 10 is a flow chart summarizing the decision selection process. At Step 48 the user identifies and enters a list of choice items from which he desires to make a most preferred choice. The user then selects or annotates any and all decision components that he believes are relevant to his choice at Step 50 using the decision component function 34. The component evaluation function 36 enables the user to assign at Step 52 the user relevant score to each decision component, reflecting their relative importance to his decision. The user relevant scores for these decision components are normalized at Step 54. Expected satisfaction scores are assigned to the choice items for each decision component at Step 56, using the evaluation perception function 38. At Step 58 each expected satisfaction score is assigned a reliability factor indicating the quality of the information used to estimate expected satisfaction. At Step 60 expected satisfaction scores and reliability scores are multiplied. The product is probable expected satisfaction. At Step 62 probable expected satisfaction scores are multiplied by the decision component user relevant scores to yield the expected value of each decision component for each choice item. In Step 64 the expected values of each decision component are summed for each choice item. This final product is the expected value of each choice item. Decision components for each choice item are rank ordered in Step 68 by their respective reliability scores. This letter information informs the user as to where he may wish to seek additional information, thereby helping to increase the wisdom of his decision.

It should be appreciated by those skilled in the art that the specific embodiments disclosed above can be easily used to modify the basic generic decision making model, and that such equivalent constructions do not depart from the spirit of the invention set forth in the appended claims.

What is claimed is:

1. A method for enabling a user to select a single choice item from a plurality of choice items, the method comprising the steps of:

selecting a plurality of choice items from which to select the single choice item;

selecting a plurality of decision components relevant to selection of the single choice item;

assigning a user relevant score to each of the plurality of decision components, the user relevant score indicating relative importance of the decision component to selection of the single choice item;

assigning an expected satisfaction score to each decision component for each choice item, the expected satisfaction score indicating expected satisfaction received from a choice item for a particular decision component; and assigning a reliability score to each of the expected satisfaction scores, the reliability score indicating the reliability of information used for determining the expected satisfaction score.

2. The method of claim 1 further including the step of selecting the single choice item in response to the user relevant score, the expected satisfaction sure and the reliability score.

3. The method of claim 2 wherein the step of ranking further includes the steps of:

determining a probable expected satisfaction score for each of the decision components of each choice item in response to the assigned expected satisfaction score and reliability score for the decision components;

determining an expected value for each of the decision components of each choice item in response to the determined probable satisfaction values and the assigned user relevant scores;

aggregating the expected values for each choice item to determine a choice item score for each choice item; and ranking the choice items according to the choice item scores.

4. The method of claim 1 wherein the step of selecting a plurality of choice items further includes the steps of:

accessing a remote data base to obtain a plurality of potential choice items via a modem; and selecting the remotely accessed choice items as desired.

5. The method of claim 1 wherein the step of selecting a plurality of decision components further includes the steps of:

accessing a remote data base to obtain a plurality of potential decision components via a modem, and selecting the remotely accessed decision components as desired.

6. The method of claim 1 further including the step of normalizing the user relevant scores.

7. A program storage device readable by a processor and tangibly embodying a program of instructions executable by the processor to assist a user in selecting one of a plurality of choice items, comprising the steps of:

selecting a plurality of choice items from which to select a single choice item;

selecting a plurality of decision components relevant to selection of the single choice item from the plurality choice items;

assigning a user relevant score to each of the plurality of decision components, the user relevant score indicating relative importance of the decision component to selection of the single choice item;

assigning an expected satisfaction score to each of the choice components of each choice item, the expected satisfaction value indicating expected satisfaction received from a choice item for a particular decision component;

assigning a reliability factor to each of the assigned expected satisfaction scores of each choice item, the reliability factor indicating the reliability of data used for assigning the expected satisfaction score; and ranking each of the choice items in response to the user relevant score, expected satisfaction score and reliability factor.

8. The program storage device as described in claim 7 wherein the step of ranking further includes the steps of:

determining a probable expected satisfaction score for each of the decision components of each choice item in response to the assigned expected satisfaction scores and reliability factors;

determining an expected value for each decision component of each choice item in response to the probable satisfaction scores and the user relevant scores;

aggregating the expected values for each choice item to determine a choice item score for each choice item; and ranking the choice items according to the choice item scores.

9. The program storage device as described in claim 7 further including the steps of normalizing the user relevant values.

10. A method for assisting a user in selecting a choice item from a plurality of choice items using a computer, the method comprising the steps of:

prompting the user with a computer display to select a plurality of choice items form among which a most preferred choice is made;

displaying the plurality of choice items selected by the user;

prompting the user with a computer display to select decision components relevant to at least one choice item selected from the plurality of choice items;

receiving user selected decision components relevant to the selection of the most preferred choice item;

prompting the user with a computer display to assign a user relevant score to each of the decision components previously selected, the user relevant score indicating the importance of a decision component to selection of the choice item;

receiving the user relevant scores entered by the user;

prompting the user with a computer display to assign expected satisfaction scores to each decision component of each choice item, the expected satisfaction score indicating expected satisfaction received from a choice item for a particular decision component;

receiving the selected expected satisfaction scores entered by the user;

prompting the user with a computer display to enter a reliability factor for each expected satisfaction score, the reliability factor indicating the reliability of data for selecting the expected satisfaction score;

receiving the reliability factor entered by a user;

adjusting, the expected satisfaction score according to the reliability factor; and ranking each of the plurality of choice items in response to the user relevant scores and the expected satisfaction scores.

11. The method of claim 10, wherein the step of ranking further include the steps of:

determining a probable expected value for each decision component of each choice item in response to the expected satisfaction score and the user relevant score;

aggregating the expected values for each choice item to determine a choice item score for each choice item; and ranking the choice items according to the choice item scores.

12. The method of claim 10 further including the step of normalizing the user relevant scores.

13. The method of claim 10 further including the step of:

accessing a remote data base to obtain a plurality of potential choice items via a modem;

presenting the plurality of potential choice items to a user for selection of choice items; and receiving the selected choice items for the user.

14. The method of claim 10 further including the step of:

accessing a remote data base to obtain a plurality of potential decision components via a modem;

presenting the plurality of potential decision components to a user for selection of decision components; and receiving the selected decision components for the user.

* * * * *